United States Patent [19]

Boyce

[11] 4,309,869
[45] Jan. 12, 1982

[54] METHOD AND APPARATUS FOR FORMING A NON-TENSIONED MULTI-CONDUIT LINE

[75] Inventor: Jennings A. Boyce, Magnolia, Tex.

[73] Assignee: Multiflex, Inc., Magnolia, Tex.

[21] Appl. No.: 170,059

[22] Filed: Jul. 18, 1980

Related U.S. Application Data

[63] Continuation of Ser. No. 1,421, Jan. 8, 1979, abandoned.

[51] Int. Cl.³ .......................... D01N 5/00; F16L 9/18; B29C 19/00; F16L 13/04
[52] U.S. Cl. ..................................... 57/293; 138/111; 285/137 R; 285/114; 156/296; 156/244.12
[58] Field of Search ................... 156/53, 55, 143, 172, 156/296, 244.12; 57/3, 10, 293, 12; 174/41, 47; 53/444; 138/111, DIG. 5; 285/131, 137 R, 114; 405/165, 178

[56] References Cited

U.S. PATENT DOCUMENTS

| | | | |
|---|---|---|---|
| 3,187,495 | 6/1965 | Christian, Jr. | 57/293 |
| 3,538,697 | 11/1970 | Hornor et al. | 57/293 |
| 3,572,024 | 3/1971 | Lyons | 57/293 |
| 3,577,873 | 5/1971 | Waters | 57/293 |
| 3,994,761 | 11/1976 | Higbee | 156/145 |

FOREIGN PATENT DOCUMENTS 2255957 4/1974 Fed. Rep. of Germany ........ 174/47

Primary Examiner—Edward C. Kimlin
Assistant Examiner—L. Falasco
Attorney, Agent, or Firm—Pravel, Gambrell, Hewitt, Kirk, Kimball & Dodge

[57] ABSTRACT

A method and apparatus for forming a non-tensioned multi-conduit line from a plurality of conduits and a central core as the plurality of conduits and central core are pulled longitudinally along the length thereof including the securing of conduits in a non-twisted contacting condition about the central core and oscillating the conduits about the central core prior to securing to alternately rotate the conduits in opposite directions about the central core such that the conduits contact the central core for substantially 360° in each direction without introducing torsional stresses on the conduits prior to the securing thereof to the central core.

12 Claims, 15 Drawing Figures

ROTATING HEAD ASSEMBLY

CONDUIT

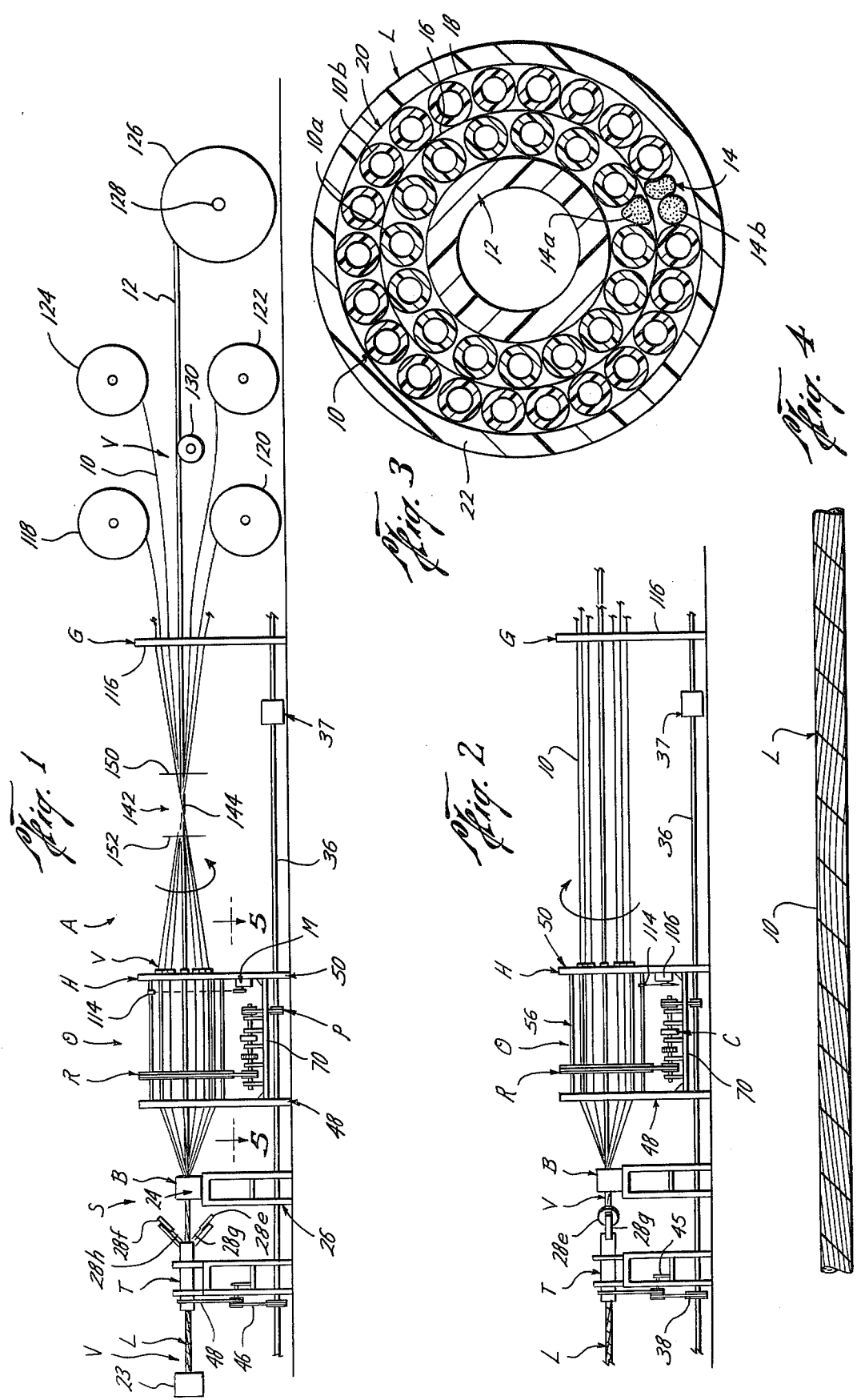

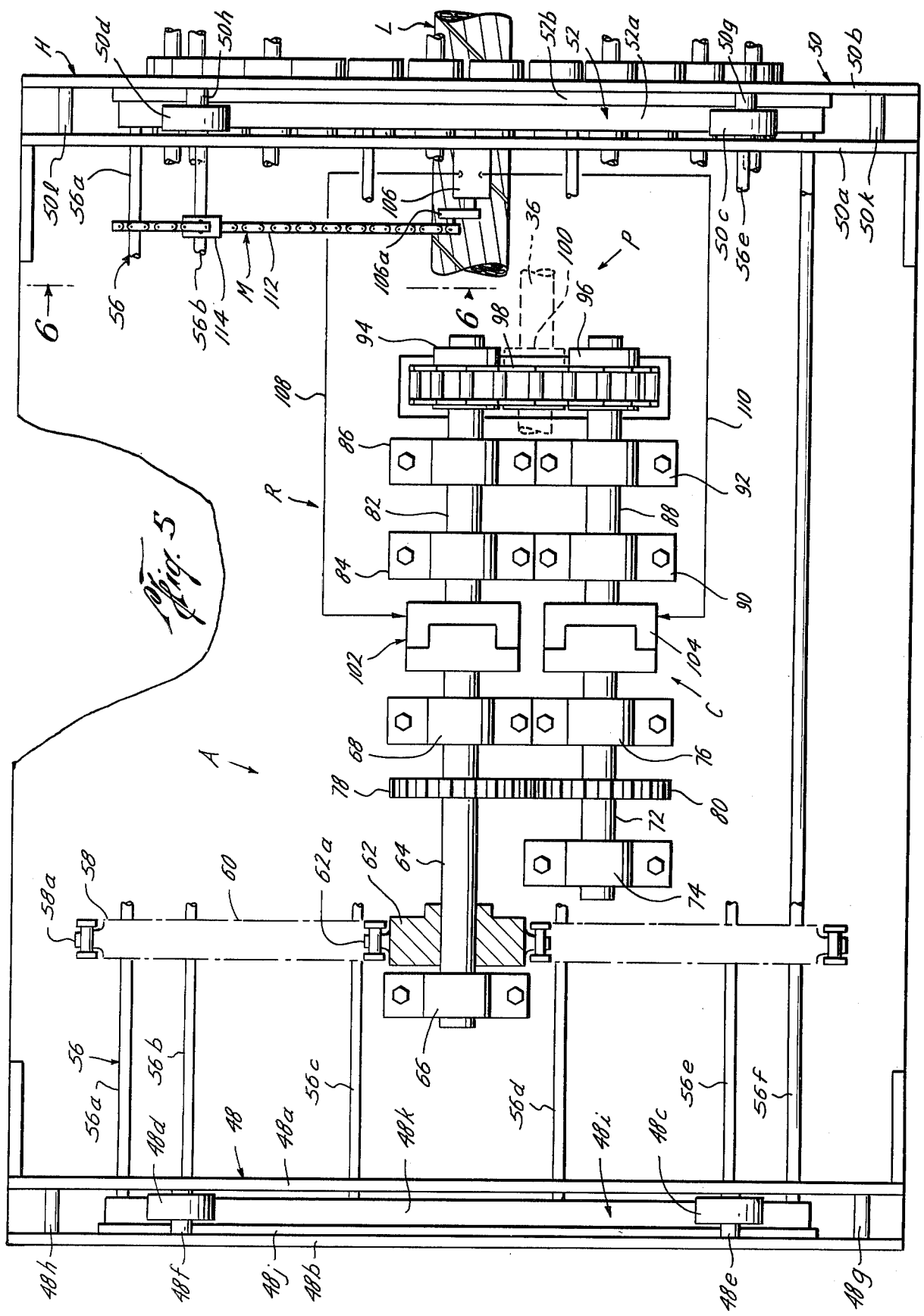

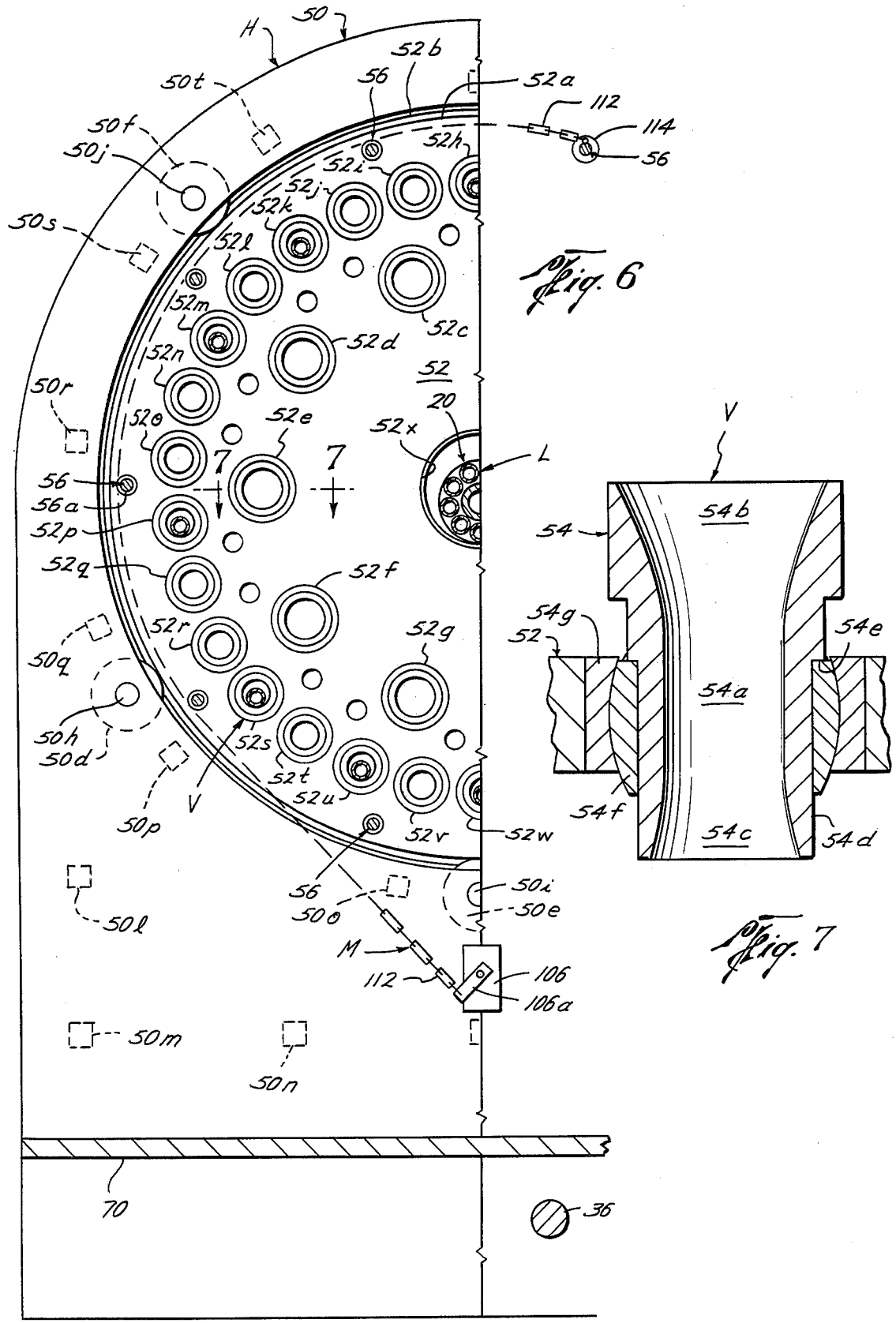

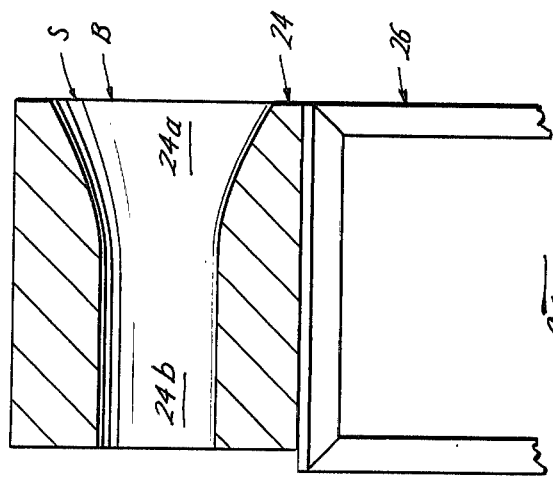
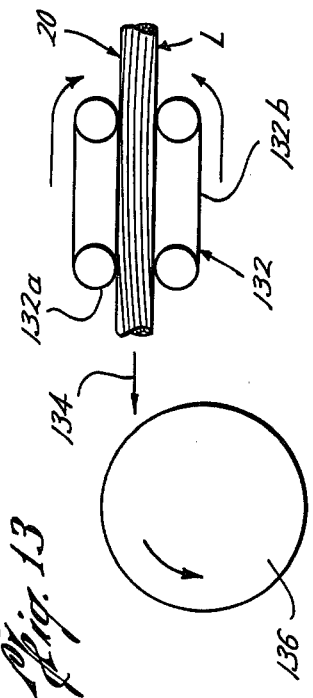
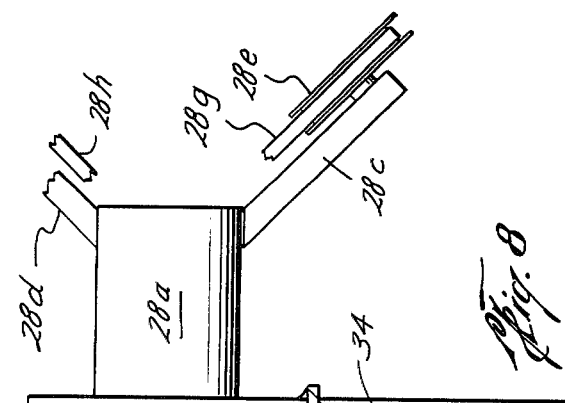
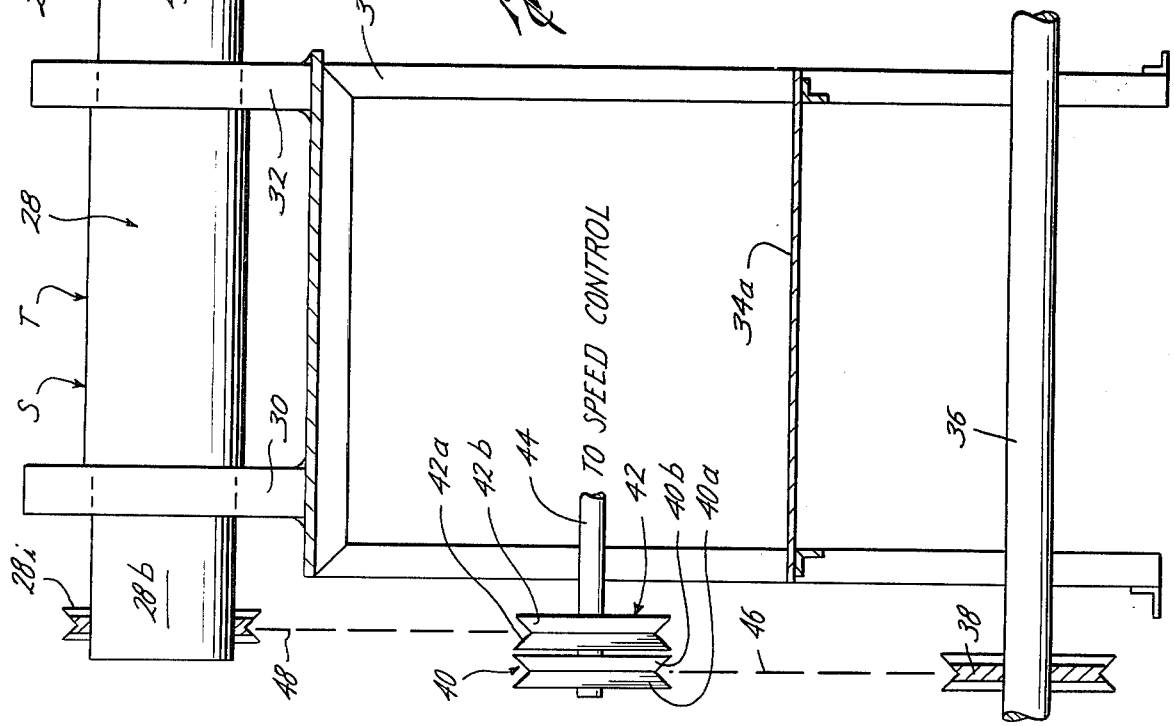

ROTATING HEAD ASSEMBLY   CONDUIT

METHOD AND APPARATUS FOR FORMING A NON-TENSIONED MULTI-CONDUIT LINE

This is a continuation of application Ser. No. 001,421, filed Jan. 8, 1979, abandoned.

TECHNICAL FIELD

The field of this invention relates to methods and apparatuses used for manufacturing a multi-conduit line from a plurality of conduits.

PRIOR ART

Many types of wrapping devices exist in the prior art, some of which have been used for wrapping wire about a tubular member as disclosed in U.S. Pat. Nos. 3,524,244 and 3,673,785. These wire wrapping devices comprehend the planetary wrapping of wire, as opposed to a hollow, tubular conduit, about a rigid tubular member, such as a drill pipe, to effectuate a proper lay of the wire about the tubular member. Other similar types of wrapping devices include those as disclosed in U.S. Pat. Nos. 3,201,298; 3,761,341; and, 3,698,986, all of which relate to the winding of a tape or wire about an elongate tubular member. Some devices as shown in U.S. Pat. No. 3,698,989, require the use of planetary feed rollers that are mounted with the shaft being wrapped and suitable for movement therewith in order to effectuate spiral wrapping of the tubular member. These planetary units are limited to the amount of weight and size of the wrapping material supportable by the feed rollers.

As shown in U.S. Pat. No. 3,779,284, a reverse helical fold pattern is somewhat successful in preventing twisting and rotation of a frankfurter casing during the filling procedures. This focuses upon a major problem inherent in multiple wrapping situations. Typically, the winding of a member about an elongate tubular member results in twist of that member as it is being wrapped about the elongate tubular member. This twist results in torsion being applied to the individual wrapping members, with the torsional stresses being cumulative along the length of the tubular member. Since typical uses of a multi-conduit line includes bending of the line, tensile stresses are introduced to the portions of the line that are to the outside of the bend of the line as are compressive forces to the inner portions of line adjacent the inside of the bend. Such forces can either kink or flatten a hollow tubular member being wrapped about a central core, if a proper planetary lay is not effectuated.

Wires and conduits have long been wrapped about central cores as shown in U.S. Pat. Nos. 3,565,118 and 3,481,549. The U.S. Pat. No. 3,481,549 reference recognizes the twisting effect that is a result of a wrapping operation and uses pre-twisted wires in the spindle taping head to relieve any torsional stresses on the wire being wrapped about the pipe prior to the planetary lay thereof. U.S. Pat. Nos. 3,032,964 and 3,646,972 all disclose core members having tubular or wire-type members wrapped thereabout wherein the core members may be wrapped in a reverse-lay configuration, which is useful for splicing into the core member as is desired. So far as known, none of these references address the problems of torsional, tensile, and/or compressive stresses and the relief thereof by means of a reverse planetary lay, much less detailing the extent to which such lay should be disposed about the central core.

U.S. Pat. No. 3,526,086 shows a typical multi-conduit underwater line having a plurality of conduits wound about a central core. Typical wire bunching apparatus continuously twist a number of wires in a non-planetary form from stationary spindles, resulting in torsional twist being introduced into the cable. Special twist elimination devices must be provided in order to minimize this additional twisting or untwisting occurring in the case of two or more wires being twisted together prior to bunching together into a cable form. As is noted hereinabove, the twist or torsional stresses that may be imposed upon such a multi-conduit type line results from the twisting incurred during the wrapping process. If torsion upon the individual conduits being wrapped can be reduced and/or eliminated then the multi-conduit line will not experience such a twisting force. Furthermore, typically such multi-conduit lines are not maintained in an entirely elongate mode, but to the contrary are typically bent about a radius adding additional tensile compressive stresses and strains to the already twisted internal component parts thereof. Therefore, to insure the integrity of the individual conduits and central core during such bending and twisting of the entire multi-conduit line, reduction of the built-up stresses becomes of the utmost importance.

SUMMARY OF THE INVENTION

It is an object of this invention to provide a new and useful method and apparatus for forming a flexible non-tensioned multi-conduit line having minimal internal stresses upon the individual conduits within the multi-conduit line for enhancing the durability and useful life of the line.

The method and apparatus for forming the non-tensioned multi-conduit line of the present invention include the steps and means for securing the conduits in a non-twisted, contacting condition about the central core and oscillating the conduits about the central core prior to the securing to alternately rotate the conduits in opposite directions about the central core such that the conduits contact the central core for substantially 360° in each direction without introducing torsional stresses on the conduits prior to the securing, as the conduits and central core are pulled longitudinally along the lengths thereof.

It should be understood that this description of the invention is not intended to be limiting but is only exemplary of the many patentable features of this invention, which are set forth in the claims herein below.

BRIEF DESCRIPTION OF THE DRAWINGS

FIG. 1 is a side elevational view of the apparatus of the present invention, capable of performing the method of the present invention, for forming a non-tensioned multi-conduit line, showing the rotating head assembly in a rotated position;

FIG. 2 is a partial side elevational view of the apparatus of FIG. 1 showing the rotating head assembly of the present invention in a neutral position;

FIG. 3 is a cross sectional end view of a multi-conduit line of the present invention;

FIG. 4 is a side view of a multi-conduit line of the present invention, showing the reverse lay of the conduits;

FIG. 5 is a plan view, partly in section, of the rotating means of the oscillating means of the present invention, as taken along the lines 5—5 of FIG. 1;

FIG. 6 is an end view of a portion of the rotating head assembly of the present invention as taken along the lines 6—6 of FIG. 5;

FIG. 7 is a sectional view of the swivel means of the present invention, as taken along the lines 7—7 of FIG. 6;

FIG. 8 is an elevational view, partly in section, of the taping means of the present invention;

FIG. 9 is a elevational view, partly in section, of the closing block of the securing means of the present invention;

DESCRIPTION OF THE PREFERRED EMBODIMENT

Figure 10:
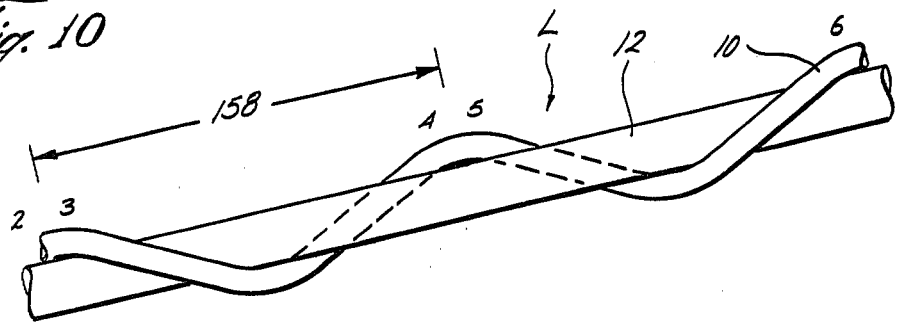
FIG. 10 is an isometric, schematic view of the central core having a singular conduit wrapped thereabout in a reverse lay fashion in accordance with the teachings of the present invention, such that the conduit contacts the central core alternately for substantially 360° in opposite directions for relieving torsional stresses on the conduits.

In the drawings, the letter A designates generally the apparatus for forming a non-tensioned multi-conduit line L of the present invention and for use in performing the method thereof. The apparatus A of the present invention is described as used for forming a non-tensioned multi-conduit line L. It should be understood that the word "tensioned" comprehends forces such as torsion, caused by twist, tension and compression due to elongation and/or bending movements. The apparatus A generally includes securing means S and oscillating means O for forming the multi-conduit line L of the present invention. Unless otherwise so specified, it is preferred the the components of the present invention are made of steel or other suitable high-strength materials capable of taking the stresses and strains incumbent upon the operation of an apparatus A of the present invention.

The method and apparatus A of the present invention are used for forming a non-tensioned multi-conduit line L from a plurality of conduits 10 and a central core 12. As best seen in FIG. 3, the multi-conduit line L is formed about the central core 12 which preferably is of a flexible construction, such as plastic or the like; however, the line L may be of a steel or other metal type of pipe construction. Where tension capacity for the multi-conduit line L is required beyond that provided by steel pipe, the central core 12 may comprise a steel cable. The central core 12 may be merely a space between adjacent conduits 10, such as in the instance of a three-conduit bundle; alternatively, the central core 12 may be of the same or different material, and/or of the same or differing size as that of the conduits 10. A plurality of flexible conduits 10 are disposed about the central core 12, with such conduits 10 being of high-pressure flexible hoses, of plastic or metal, which may be utilized to transport a variety of substances. For example, in the operation of oil production from underwater sources, it is frequently required to provide gas under pressure through one conduit in order to force the oil in a return path through another conduit to a surface facility. At the same time, waste gases may need to be vented, and other conduits are available for this purpose. A plurality of conduits 10 forming a single line L provides for these uses plus a variety of control function uses, such as utilization in hydraulic networks for providing control line pilot valve pressures and return paths.

Typically, non-used conduits 10 are included in such a multi-conduit line to provide extra, spare conduits in the event that failure should occur of a conduit 10 within the multi-conduit line L. Suitable fillers 14 such as rope 14a may be used for filling up space between adjacent conduits 10 in the event that the number of conduits needed in any particular multi-conduit line L is less than the number necessary to fill out an entire layer of conduits about the central core 12. The fillers 14 may further include a steel cable 14b, if it is necessary that tensile strength of the line L while being laid, or if the line L is utilized as a riser, the line L can withstand sufficient tension to allow the line L to be maintained in a substantially vertical straight line. Other conduits 10 provide for the conduction of electrical power and/or communication signals where circumstances so require as in the instance of an underwater life support facility.

The multi-conduit line L may include several layers of conduits 10 with each layer being successively wrapped about the central core 12 and the succeeding layer. As shown in FIG. 3, the multi-conduit line L includes two layers of conduits 10a, 10b with inner conduits 10a adapted to be disposed adjacent to and in engagement with the central core 12 and outer conduits 10b, adapted to be disposed adjacent inner conduits 10a. Multiple layers of additional conduits (not shown) may also be used as desired. It is preferred that each layer is contrahelically wound with respect to the prior layer in such multiple layer multi-conduit lines L. Typically, each layer is separated by an appropriate wrap 16 to prevent improper positioning between adjacent conduits 10 and as in the case of wrap 18, secure all conduits 10 in a bundle 20 about the central core 12. Typically, a plastic sheath 22 is formed about the bundle 20 for firmly bundling together the entire assembly of conduits 10 and central core 12 to protect the bundle 20 from any and all adverse environmental effects and to retain the integrity thereof. The plastic sheath 22 is typically extruded about the bundle 20 by a cover forming means designated generally as 23 as is well known, and may be of any suitable material such as polyurethane or polyethylene or the like. The method and apparatus A of the present invention are adapted to be used for forming such a non-tensioned multi-conduit line L capable of handling stresses and strains typically encountered in manufacturing such a line L as well as encountered when utilizing such a line L.

The apparatus A of the present invention includes generally securing means S for securing the conduits 10 in a non-twisted, contacting condition about the central core 12 and oscillating means O as described more fully hereinbelow. The securing means S includes closing block B, taping means T and forming means F. The closing block B includes block 24 (FIG. 9) preferably formed having a converging throat 24a and an inner chamber 24b adjacent thereto. The block 24 is adapted to be supported on an appropriate closing block stand 26. The closing block B is used for closing the plurality of conduits 10 from an expanded position about the central core 12 into engagement with the central core 12 to form a bundle 20.

The securing means S further includes taping means T for taping the conduits 10 together about the central core 12 for securing the bundle 20 together, with the taping means T receiving the bundle 20 from the closing block B. The taping means T includes a taping head 28 (FIG. 8) having a taping end 28a and a power end 28b. The taping end 28a preferably includes tape supports 28c, 28d with each of such tape supports capable of supporting an appropriate tape spool such as spool 28e affixed with tape support 28c and spool 28f (FIG. 1) with tape support 28d. The tape spools 28e, 28f are adapted to dispense an appropriate tape 28g, 28h (FIGS. 1, 8) for wrapping about bundle 20 for securing the conduits 10 with the central core 12 as discussed more fully hereinbelow. The taping head 28 preferably includes a power pulley 28i mounted with power end 28b of the taping head 28. The taping head 28 is rotatably supported by bearings 30, 32 mounted with taping head stand 34, which supports the taping head 28 in such a position that it may be longitudinally aligned with the closing block 24. The taping head 28 is adapted to be rotated in bearings 30, 32 by means of powered rotation of power pulley 28i.

An elongate power shaft 36, rotatively powered by motor means designated generally as 37, which may include an electric motor or any other suitable power source, is adapted to have an appropriate power pulley 38 mounted therewith for simultaneous rotation of the power shaft 36 and power pulley 38. Rotation of the power pulley 38 results in rotation of speed control pulleys 40, 42 mounted on speed control shaft 44, by means of the operative, powered engagement of the power pulley 38 and speed control pulley 40 by a suitable belt 46 or any other suitable connecting power device such as a chain, or the like. The speed control pulley 42 operatively engages the power pulley 28i of the taping head 28 by means of belt 48, which may also include any suitable chain or other similar power transfer device. Thus, rotation of the power shaft 36 results in appropriate rotation of the taping means T of the present invention. It is preferred that the speed control pulleys 40, 42 be of such a construction that the pulley halves 40a, 40b, 42a, 42b, respectively, are not fixedly mounted theretogether, but rather are resilient between respective halves such as 40a, 40b. This resiliency which is preferably accomplished by spring loading of the pulley halves allows for expansible, variable diameter speed control pulleys 40, 42. By movement of the speed control shaft 44 to and from the power shaft 36 and from and to the taping head 28, a resultant pulley diameter change is effectuated, causing an overall gearing change between the power shaft 36 and the taping head 28 to effectuate an overall speed change of rotation of the taping head 28 with respect to that of the power shaft 36. The speed control shaft 44 is mounted by a movable support 45 with the taping head stand 34 on platform 34a (FIG. 8) permitting such relative movement of the speed control shaft 44 with respect to the power shaft 36 and taping head 28. Thus, the rate of rotation of the taping head 28 may be regulated by appropriate movement of the speed control shaft 44 with respect to the taping means T and the power shaft 36 as is desired.

The apparatus A of the present invention further includes oscillating means O which is adapted to be mounted in longitudinal alignment with the securing means S for oscillating the conduits 10 about the central core 12 to alternately rotate the conduits 10 in opposite directions about the central core 12 such that the conduits 10 contact the central core 12 for substantially 360° in each direction without introducing torsional stresses on the conduits 10 as described more fully hereinbelow. The oscillating means O includes generally a rotating head assembly H and rotating means R. The rotating head assembly H includes first and second guide plate assemblies 48, 50. The first guide plate assembly 48 includes guide plate supports 48a, 48b adapted to be disposed substantially parallel with one another having a plurality of head guides or rollers such as rollers 48c, 48d disposed therebetween, on spacer shafts 48e, 48f, respectively. Additional spacers such as 48g, 48h may be used as needed to insure that the guide plate supports 48a, 48b maintain a substantially parallel relation with respect to one another. A guide plate 48i is adapted to be disposed between the guide plate supports 48a, 48b and rotatably supported by head guide or rollers such as rollers 48c, 48d for rotation with respect thereto. Preferably the guide plate 48i includes an appropriate roller guide lip 48j to insure proper alignment of such rollers as rollers 48c, 48d with the exterior roller surface 48k of the guide plate 48i as is discussed more fully hereinbelow.

The second guide plate assembly 50 includes guide plate supports 50a, 50b that are adapted to be mounted in substantial parallel relation with one another. Head guides or rollers such as rollers 50c, 50d (FIG. 5) as well as rollers 50e, 50f (FIG. 6) are mounted therebetween guide plate supports 50a, 50b on respective spacer shafts 50g, 50h, 50i, 50j, respectively. Spacers such as spacers 50k, 50l, 50m, 50n, 50o, 50p, 50q, 50r, 50s, 50t, all insure that the guide plate supports 50a, 50b are maintained in substantially parallel relation with respect to one another. Any suitable number of spaces may be used. The second guide plate assembly 50 further includes guide plate 52 adapted to be disposed between guide plate supports 50a, 50b and supportable therebetween by means of rollers such as rollers 50c, 50d, 50e, 50f for rotational movement of the guide plate 52 with respect to the guide plate supports 50a, 50b. It is preferred that the rollers 50c, 50d, 50e, 50f engage the exterior roller surface 52a of the guide plate 52 with the roller guide lip 52b insuring proper roller location on exterior roller surface 52a.

As best seen in FIG. 6, the guide plate 52 includes a plurality of openings formed therein for receiving inner wrap bushings such as inner wrap bushings 52c, 52d, 52e, 52f, 52g. The inner wrap bushings are adapted to receive conduit 10 therein as described more fully hereinbelow. A plurality of outer wrap bushings are adapted to be disposed in a suitably formed openings in guide plate 52 and include outer wrap bushings 52h–52w which are mountable in such openings and are adapted to receive conduits 10 therein. Furthermore, the guide plate 52 is formed having a central core opening 52x and adapted to receive the bundle 20 therein or simply a central core 12 as described more fully hereinbelow. While the inner wrap bushings vary in bore diameter from the outer wrap bushings, it is preferred that both the inner wrap bushings and outer wrap bushings be of substantially the same structure as that shown in FIG. 7 with such bushings constituting the swivel means V of the present invention.

The swivel means V is mounted with the rotating head assembly H for receiving the conduits 10 therein for preventing the impartation of torque to the conduits 10 upon rotation of the rotating head assembly H. Typically, the swivel means V includes such a bushing as bushing designated generally as 54. Such a bushing preferably includes an inner throat 54a having a converging entrance 54b and a diverging exit 54c adjacent to the throat 54a. The bushing 54 of the swivel means V of the present invention further includes an exterior surface 54d which is preferably of a cylindrical configuration having a lip 54e formed adjacent thereto wherein an appropriate bearing 54f is adapted to be mounted about and in engagement with exterior surface 54d and in abutting relation with lip 54e. The bearing 54f is adapted to be disposed in bearing mount 54g which is adapted to be disposed within a suitable formed opening in the guide plate 52. It is preferred that the mating surfaces between the bearing 54f and the bearing mount 54g be of a spherical configuration allowing for rotational movement of the bushing 54 with respect to the guide plate 52. Furthermore, the spherical mounting allows relative movement of the bushing 54 not only rotationally with respect to the guide plate 52 but also at an angle with respect to the guide plate 52 rather than strictly at a 90° perpendicular relation therebetween.

It is preferred that the first guide plate 48i be formed in a similar fashion to that of the guide plate 52, having correspondingly formed openings therein and if desired, be formed such that appropriate swivel means V may be inserted in such openings as is desired. Suitable connecting means designated generally as 56 which includes rods 56a, 56b, 56c, 56d, 56e, 56f are mounted with both the guide plate 48i and guide plate 52 and permit a rigid mounting therebetween. The apparatus A of the present invention further includes rotating means R for operably engaging the rotating head assembly H for rotatably oscillating the rotating head assembly H more than 360° in alternate opposite directions to result in contact of the conduits 10 with the central core 12 for substantially 360° engagement therebetween in each direction for relieving torsional stresses on the conduits 10.

The rotating means R includes power means P for providing power for rotating the rotating head assembly H and for operably engaging the same. The power means P includes a sprocket 58 mounted with the connecting means 56 of the rotating head assembly H. It is preferred that the sprocket be mounted thereabout the exterior of the connecting means 56 forming a sprocket ring. The sprocket 58 is preferably formed having teeth 58a for engaging a suitable chain 60. The chain 60 engages main drive gear 62 adjacent teeth 62a formed with the main drive gear 62. The main drive gear 62 is mounted on drive shaft 64 which is rotatably supported by bearings (not shown) housed within pillow blocks 66, 68 mounted with platform 70 (FIGS. 1 and 2). A reversing drive shaft 72 similarly is mounted for rotation in bearings (not shown) housed in pillow blocks 74, 76. Spur gears 78, 80 are mounted with drive shaft 64 and reversing drive shaft 72, respectively and are in gearable contact therebetween. Drive shaft 82 is mounted for rotation with the platform 70 by means of bearings (not shown) mounted in pillow blocks 84, 86 while similarly, drive shaft 88 is mounted with the platform for rotation by means of bearings (not shown) mounted in pillow blocks 90, 92. Preferably, sprocket 94 is mounted with drive shaft 82 and sprocket 96 is mounted with drive shaft 88 and adapted to receive a suitable chain 98 extending therebetween and in engagement with both sprockets 94, 96 as well as in engagement with an appropriate sprocket 100 mounted with power shaft motor 36. As a consequence, rotation of the power shaft 36 means 37 results in rotation of sprocket 100 which because of the engagement of chain 98 with sprockets 94, 96 both drive shafts 82, 88, respectively rotate.

A clutch 102 selectively connects drive shaft 64 with drive shaft 82 while clutch 104 selectively connects drive shaft 72 with drive shaft 88. It is preferred that clutches 102, 104 be electrically actuated, however, any other suitable type of clutching device may be used as is desired. The clutches 102, 104 comprise the clutch means C of the present invention which is useful for selectively rotating the rotating head assembly H in alternate directions as described more fully hereinbelow.

The apparatus A of the present invention further includes limit means M with the rotating head assembly H for limiting the amount of rotation of the rotating head assembly H in each direction before reversal of direction of the rotation. The limit means M includes a limit switch 106 having an actuating arm 106a. The actuating arm 106a is movable between a first and second position wherein in the first position, electrical current is directed from the limit switch 106 through electrical cable 108 to clutch 102 for actuation thereof. When the actuating arm 106a is in a second position, the limit switch directs electrical current through electrical cable 110 to clutch 104 for actuation thereof. Movement of the actuating arm 106a between such first and second positions is resultant to action of a chain 112 or any other suitble line being connected with the actuating arm 106a and with a lmit stop 114 with such limit stop 114 being mountable with connecting means 56 such as rod 56b. Preferably, the chain 112 is adapted to be disposed about the connecting means 56 such that upon rotation of the rotating head assembly H, the chain 112 wraps about the exterior of the connecting means 56 until an extended position is reached, whereinafter the actuating arm 106a is moved from one position to the other. Other mechanical or electrical means could be used, if desired.

As is shown in FIG. 5, rotation of the power shaft 36 results in rotation of drive shafts 82, 88. If clutch 102 is electrically engaged by limit switch 106, then the rotational torque of drive shaft 82 is transmitted through clutch 102 into drive shaft 64, to main drive gear 62, chain 60 thereinto sprocket 58 for rotating the rotating head assembly H of the present invention. As the rotating head assembly H rotates, the chain 112 wraps about the exterior of the connecting means 56 until the chain 112 is in a fully extended position whereinafter causing movement of the actuating arm 106a of the limit means M. Movement of the actuating arm 106a disengages clutch 102 and engages clutch 104 whereinafter rotation of the power shaft 36 results in rotation of drive shaft 88, clutch 104 which engages with and connects to drive shaft 72. Rotation of spur gear 80 and 78 again results in rotation of drive shaft 64, however in a direction opposing that of the direction of drive shaft 82 because of the spur gear 78, 80 relationship. Thereafter, rotation in this opposite direction is effectuated through main drive gear 62, chain 60, and sprocket 38. When rotating in the opposite direction, the chain 112 unwinds from its fully extended position until it reaches a neutral position and then begins winding about the exterior surface of the connecting means 56 until the chain 112 is fully extended in the opposing direction whereinafter the limit switch 106 is thereafter switched again into the opposite position, thus disengaging clutch 104 and engaging clutch 102 to again effectuate a reversal of direction of rotation of the rotating head assembly H of the present invention. It will be appreciated that both drive shafts 82, 88 rotate in the same directions as does drive shaft 72 when clutch 104 is engaged. However, drive shaft 64 may rotate in alternate directions based upon engagement of clutch 102 or clutch 104 to effectuate rotational direction reversal. Thus, the clutch means C is in operative engagement with the power means P and the limit means M for selectively rotating the rotating head assembly H in alternate directions with the clutch means C being responsive to the limit means M.

The apparatus A of the present invention further includes fixed guide G including guide member 116 in longitudinal alignment with the rotating head assembly H of the present invention. It is preferred that the guide member 116 be of a singular plate type construction having a plurality of openings (not shown) formed therein but correspond substantially to the number of openings formed in the guide plates 48i, 52. While it is important that the number of openings formed in the guide member 116 be equal to the number of openings formed in the guide plates 48i, 52, it is not necessary that the radial spacing of such openings be the same as it is for the guide plates 48i, 52 of the rotating head assembly H of the present invention, as discussed below.

The fixed guide G is adapted to receive a plurality of conduits from fixed payout reels, such as payout reels 118, 120, 122, 124 and received the central core 12 from fixed payout reel 126. The fixed payout reels 118, 120, 122, 124, 126 are simply mounted about an appropriate spindle such as spindle 128 for supporting such reels for rotation thereabout; however, the spindles 128 support the payout reels but do not move with respect to the reels nor move the reels in accordance with any particular demonstrated or needed motion. Thus a spindle 128 merely supports payout reel 126 so that the payout reel 126 may rotate thereabout. Furthermore, guide rollers 130 may be used to properly direct and support either the conduits 10 or central core 12 as desired.

In the operation and use of the apparatus A of the present invention for forming a non-tensioned multiconduit line L, the central core 12 is reeled from the payout reel 126 and threaded through the central portion of the fixed guide G, therethrough the central opening 52x of the guide plate 52, through a similar formed opening in guide plate 48i, into the closing block B and thereinto the taping means T. It should be understood that multiple layer of conduits such as conduits 10a, 10b may be wrapped about the central core 12 with each conduit-central core bundle 20 thereafter becoming the central core 12. For example should it be desired that a two-layer multi-conduit line L be formed, a first layer of inner conduits 10a would be formed about the central core 12 as described hereinbelow and thereafter a second layer of outer conduits 10b would be preferably contrahelically disposed about the inner conduit 10a, central core 12 combination, with such combination becoming the central core for the succeeding layer of outer conduits 10b.

After the core member 12 is positioned with the apparatus A of the present invention, the desired number of conduits 10 are reeled from their respective fixed payout reels through the fixed guide G (FIG. 2) thereinto the corresponding swivel means V formed with the guide plate 52, thence to similarly formed openings in guide plate 48i, thereinto the closing block B and taping means T for securing the initial grouping of conduits 10 and central core 12 together. As shown schematically in FIG. 12, the bundle 20 is directed through an appropriate belt puller 132, which may include plural belts 132a, 132b which are adapted to engage the bundle 20 for exerting a pulling force thereon in the direction of arrow 134. The belt puller 132 draws the conduits 10 and central core 12 through the apparatus A of the present invention and directs the same onto collecting reel 136. The belt puller 132 may be of a variable speed to regulate the rate at which such conduits 10 and central core 12 are pulled through the apparatus A of the present invention. Thus, the apparatus A of the present invention is substantially configures as shown in FIG. 2 of the initial startup position.

As the belt puller 132 is actuated, the oscillating means of the present invention begins to function for oscillating the conduits 10 about the central core 12 to alternately rotate the conduits 10 about the central core 12 to alternately rotate the conduits 10 in opposite directions about the central core 12 such that the conduits 10 contact the central core 12 for substantially 360° in each direction for relieving torsional stresses on the conduits 10. As the bundle 20 is pulled by the belt puller 132, the rotating head assembly H begins to oscillate in response to the rotating means R. As the rotating head assembly H begins to rotate, the portions of the conduits 10 between guide plates 48i, 52 remain substantially equidistant and parallel to the central core 12 during such rotation. However, the portion of the conduits 10 between the guide plate 52 and the fixed guide G begin to twist in response to rotation of the rotating head assembly H. This occurs simultaneously with the pulling on the bundle 20 by the belt puller 132. As the bundle 20 is pulled, the conduits 10 are directed from an expanded position about the central core 12 with the rotating head assembly H into engagement with a central core 12 to form a bundle 20 in the closing block B. The rotating action of the rotating head assembly H results in a helical lay of the conduits 10 about the central core 12 in response to rotation of the rotating head assembly H. As the helical lay of the conduits 10 is closed in the closing block B, the taping means T tapes the bundle 20 together to secure the conduits 10 in engagement with the central core 12.

The rotating means R rotates the rotating head assembly H to a position more than 180° from the initial startup position as shown in FIG. 2 to such a position as shown in FIG. 1. The extent of rotation of the rotating head assembly H is limited by the limit means M. At the point of maximum rotation of the rotating head assembly H in either direction from the start up position of FIG. 1, the limit means M trips the actuating arm 106a and reverses direction thereof and then permits rotation thereof in the opposite direction, through the neutral position of FIG. 2, to such a position greater than 180° in the opposite direction. It is necessary that the rotating head assembly H oscillate more than 360° to effectuate a 360° lay of the conduit 10 about the central core 12. By laying the conduit 10 in a substantially 360° engagement with the core member 12 and then reversing the lay 360° in the opposite direction, a non-tensioned multi-conduit line L is formed that is capable of being bent about a radius without significant stresses being localized in particular conduits 10 since no singular conduit 10 would be on the inside or outside of the bend.

Figure 11:
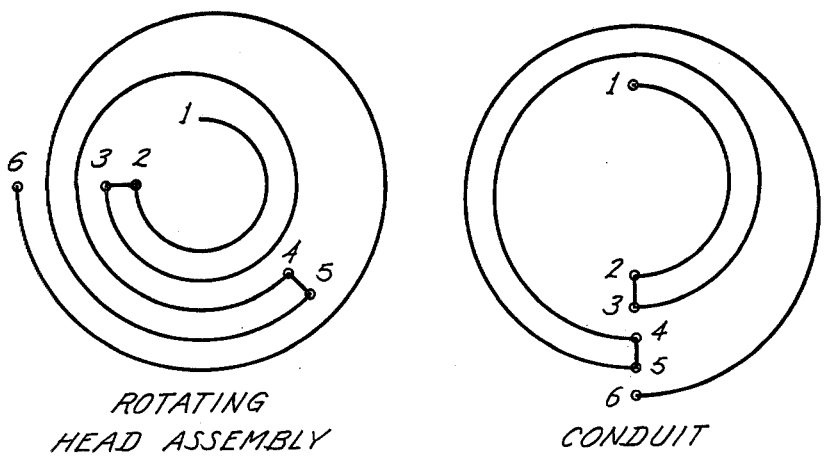
FIG. 11 is a schematic end view of the rotational track of the rotating head assembly of the present invention verses that of the conduit being laid about the central core.

As shown by the track of the rotation of the rotating head assembly H and conduit lay as shown in FIG. 11, at point 1, the rotating head assembly H and conduit 10 are in a substantially neutral position as shown in FIG. 2. As a rotating head assembly H is initially rotated to a position greater than 180° such as at point 2, the conduit 10 is laid about the central core 12 achieving substantially a 180° lay of the conduit 10 about the central core 12. This is a half cycle necessary for start-up from the neutral position. The rotating head assembly H then must necessarily rotate greater than 360° from point 3 to point 4 to insure that a 360° lay of the conduit is effectuated because of a delay that occurs between the first guide plate assembly 48 and the closing block B. The delay necessitates the greater than 360° rotation of the rotating head assembly H. Increases in distance between the first plate assembly 48 and the closing block B, changes in pulling speeds of the belt pulley 132, and the diameter of the line L all effect this delay, and consequent by the amount of rotation of the rotating head assembly H that is necessary. It has been found that rotation beyond 600° from the maximum position of points 2–3, or 4–5, to the next maximum position, is a maximum necessary for insuring a 360° lay of conduit about the central core 12.

At point 2, the limit means M is actuated causing reversal of rotation of the rotating head assembly H as at point 3 and the consequent reverse lay of the conduit 10 as it is laid back in a reverse direction about the central core 12. The rotating head assembly H thereafter rotates to point 4–5, again a maximum position as in FIG. 1. As a result of this rotational oscillation of the rotating head assembly H, the conduit 10 is accordingly wrapped in a reverse direction about the central core 12 such that at point 4 the rotation of the rotating head assembly H is at a substantially maximum position whereinafter at point 5, the lay of the conduits 10 begins reversal.

The reverse lay of the conduits 10 is effectuated in the bundle 20. This reverse lay feature is most graphically shown in FIG. 10 in an exaggerated fashion to clearly demonstrate the reverse lay concept of the present invention. The points identified and discussed with respect to FIG. 11 are identified in FIG. 10 and constitute the same points with respect to one another as to the position of the conduit 10 with respect to the central core 12 and rotating head assembly H. Thus, the conduits 10 are oscillated planetarily about the central core 12 and laid in substantially opposing 360° directions.

As the rotating head assembly H of the apparatus A of the present invention is rotated by the rotating means R, twist in the conduits 10 occurs between the guide plate 52 and fixed guide G. Localizing means designated generally as 142 localizers torsional stresses primarily between the fixed guide G and/or payout reels and substantially the midpoint of the distance between the rotating head assembly H and the fixed guide G at point 144 (FIG. 1) which is the center of twist of the conduits 10. The determination of the location of point 144 is based upon a relative comparison of the diameters of the plurality of openings formed in the guide plate 52 and the fixed guide G. It is preferable that the diameter described by the openings formed in the guide plate 52 be greater than that of the fixed guide G to result in the center of twist point 144 occurring closer to the fixed guide G than the rotating head assembly H.

With the diameter described by the openings formed in the fixed guide being the same size or smaller than that of the guide plate 52, the twist in the conduits 10 as they are reeled from the payout reels results in conduit twist being isolated between the center of twist point 144 or between point 144 and the fixed guide G. As shown in FIG. 1, in response to rotation of the rotating head assembly H the conduits tend to wrap about the central core 12 at point 144 with there being frictional engagement therebetween. This wrapping action at point 144 isolates the conduit twist at the rotating head assembly H as it is further rotated, with the added twist being localized between point 144 and the fixed guide G or payout reels 118, 120, 122, 124, 126. This localized twist in the conduit 10 is not transmitted through point 144 to the rotating head assembly H into the closing block B because the frictional engagement between the conduit 10 and central core 12 at point 144. Accordingly, such torsional stresses are isolated from and do not become transmitted to that portion of the multi-conduit line L where the conduits 10 are closed about the central core 12 in the closing block and thereafter tapped by the taping head 34 to result in a non-twisted bundle 20. As the twisting action of the conduits 10 is untwisted because of reverse rotation of the rotating head assembly H, the conduits 10 adjacent point 144 in response to reverse rotation tend to unwind and consequently release any torsionally stresses imposed upon the conduits between point 144 and the fixed guide G or payout reels, such that when the conduits do not engage the central core 12 little if any stresses are along the length of the conduits 10 as is feed through the rotating head assembly H and thereafter closed about the central core 12 in the closing block B.

As noted above, the amount of overrun of the rotating head assembly H beyond 360° to insure a 360° lay of the conduit 10 about the central core 12 depends upon the delay between the closing block B and the rotating head assembly H as well as the speed with which the belt puller 132 pulls the bundle 20 through the apparatus A of the present invention. Thus, the pulling speed of the belt puller 132 and rotation speed of the rotating head assembly H determine the length 158 (FIG. 10) of a lay of conduit about the central core 12. Furthermore, the overrun of the rotating head assembly H is determined by the overall diameter of the guide plates 48i, 52 as well as the number of conduits 10 that are being included and wrapped about the central core 12. The swivel means V prevents the imposition of torque on the conduits upon rotation of the rotating head assembly H such that substantially no such torque is imposed to the conduits 10 between center of twist point 144 and the closing block B during rotation thereof. A singular guide plate, as distinguished from the plural guide plates 48i, 52 may be used if desired to satisfactorily perform the functions of the present invention; however, in order to minimize bending moments on the conduits 10 as it passes through the rotating head assembly H, it is preferred that the two parallel guide plates such as guide plate 48i, 52 be used.

By wrapping the conduit 10 about the central core 12 in a reverse oscillatory fashion of substantially 360°, the forces of extension and compression upon the conduit 10 during bending of the line L about a given diameter is in overall balance. It is for this reason that a substantially 180°–360° lay of conduit 10 is not sufficient. Laying the conduit 10 about the central core 12 for merely 90° and thereafter reversing the lay will cause a resultant elongation or tension forces to appear in some component parts of the conduit 10 while some compression forces will be manifest in other portions thereof during bending of the multi-conduit line L about a radius. Thus, the forces are balanced in any plane of bend of such a multi-conduit line L except in the neutral conduit sections at points 2–3 and 4–5 of FIGS. 10, 11, which are preferably of short length in order to minimize any tension or compression build ups.

The manufacturing of a multi-conduit line L according to the teachings of the present invention results in a line L is substantially tension free, allowing the line L to be bent in a wide variety of directions. It has been found that the minimum bend radius of the line L is approximately 6 times the finished outside diameter of the line L. After the bundle 20 is collected in the collecting reel 136, the appropriate covering or sheath 22 is extruded about the bundle 20, to provide an overall flexible, protective coating for the line L. The balance of the torsion and compression forces due to the 360° oscillation prevents kinking or flattening out of any of the conduits 10 which would thus render such conduits inoperative or ineffective for its intended purposes. Thus, the line L may be subjected to as great a bending and torquing as prior art multi-conduit cables, therein achieving the results of a planetarily laid multi-conduit cable without the limitations thereof.

The apparatus A of the present invention may be used for wrapping multiple layers of conduits 10 about a central core 12 with the apparatus A as shown in FIG. 1 adapted to be multiple apparatuses A aligned with one another such that the output of one of such apparatus A acts as a central core 12 for a subsequent apparatus A and so forth, up to how ever many layer of conduits 10 are needed for any particular multi-conduit line. As shown in FIG. 1, the power shaft 36 for example may be extended to appropriately power multiple taping heads 34 or rotating head assemblies H as is needed in forming a multiple layer multi-conduit line L of the present invention.

Figure 12:
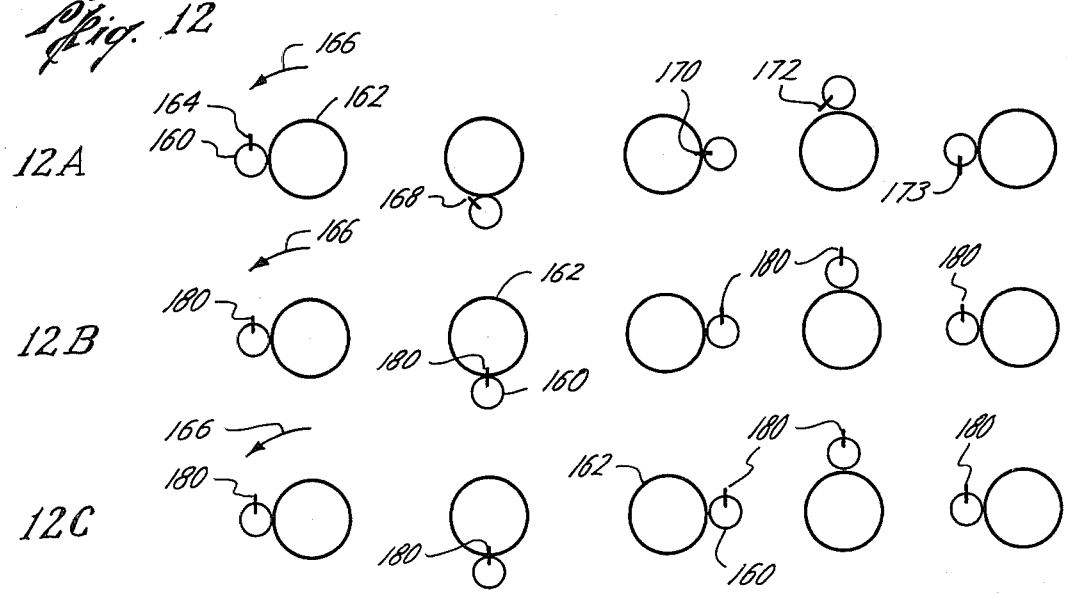
FIGS. 12a, 12b, 12c detail the torsional stresses on a conduit hypothetically in engagement with the central core various positions shown in FIG. 1; and, FIG. 13 schematically shows the pulling means for drawing the multi-conduit line through the apparatus of the present invention and reeling the same onto the collecting reel.

For the purposes of illustration and helping to visualize the stresses that may be imposed upon a conduit 10, a conduit 160 and central core 162 are shown in FIG. 12 to schematically illustrate the rotational conduit stresses involved. FIG. 12a illustrates the schematic conduit stresses at a cut designated 150 (FIG. 1), FIG. 12b the stresses involved at a cut at 152 and FIG. 12c stresses involved at the closing block B, with all figures showing a full 360° rotation of the conduit 160 about the central core 162 at each respective cut 150, 152 and at the closing block B. A reference mark 164 is placed on each conduit 160 to indicate the amount of twist at the respective cut. Based upon the cut at 150, as shown in FIG. 12a, rotation of the conduit 160 about the central core 162 results in movement of the reference mark 164 in the direction of rotation of arrow 166. Thus, a torsional stress is imposed upon the conduit 160 with respect to the central core 12 such that the reference 164 moves from a substantially upper most position to a lower position 173 in response to counter clockwise rotation of the rotating head assembly H. This action results in a twist or torque in the conduit 160 which is detrimental to the overall integrity of the multi-conduit line L. However, in response to the same rotation designated by arrow 166 in FIG. 12b and 12c, it should be noted that at corresponding conduit-central core relationships simultaneously result in the reference point 180 being at an upper most position in all orientations of the conduit 160 with respect to the central core 162. Thus, between the center of twist at point 144 through the oscillating means O including the rotating head assembly H of the present invention through and to the closing block B, the conduit 160 experiences no twist with respect to the central core 162 resulting in a non-stress, non-twisted conduit.

It is preferred that the length of the neutral portions such as at 2–3 and 4–5 of FIG. 10 be small to minimize the possibilities of compressive and tensile forces being localized at such locations during bending of the line L. Furthermore, in the instance of multiple layers of conduits 10, it is preferred that the neutral positions be displaced from one another such that they are not coincident to further prevent any undesirable stressing thereof because of the coincidence thereof during bending actions. As the multi-conduit line L is bent about a radius, the outer fibers of the outer conduits through the bend experience elongation and tensioning while the outer fibers of the conduits to the inside of the bend experience compressive loading. For this reason, the conduits 10 may not be simply longitudinally aligned with the central core 12 but must be helically wound substantially 360° to distribute the bending stresses so that no singular conduit 10 experiences stresses sufficient enough to destroy the integrity thereof. As a consequence, the reverse 360° lay of the conduit 10 about the central core 12 of the present invention results in the formation of a multi-conduit line L that is non-tensioned and substantially stress free, further being capable of substantial bending movement in its assembled form, in addition to minimizing the risk of damage to the individual conduits 10 of the multi-conduit line L.

Thus, in performing the method for forming a non-tensioned multi-conduit line L of the present invention, the conduits are secured in a non-twisted contacting condition about the central core 12 adjacent the closing block B and thereafter oscillated about the central core 12 to alternately rotate the conduits 10 in opposite directions about the central core 12 such that the conduits 10 contact the central core 12 for substantially 360° in each direction without introducing torsional stresses on the conduits 10 prior to securing the conduits 10 theretogether. The conduits 10 and central core 12 are directed from a plurality of fixed payout reels through the fixed guide G, guided through the rotating head assembly H such that the conduits 10 and central core 12 extend between the fixed guide G and rotating head assembly H with the conduits disposed substantially equidistant about the central core 12 along the length thereof. The oscillation of the rotating head assembly H is accomplished by rotational movement of the rotating head assembly H by the rotating means R. The torsional stress of twisting of the conduit 10, if any, are localized between the fixed guide G and/or payout reels 118, 120, 122, 124 and the rotating head assembly H, most notably between center of twist 144 and the fixed guide G and/or payout reels 118, 120, 122, 124 under contacting conditions between conduit 10 and central core 12 at point 144. The oscillation of the rotating head assembly H includes rotational movement greater than 360° alternating in opposite directions to result in contact of the conduits 10 during the securing phase with the central core 12 for substantially 360° engagement therebetween in each direction without introducing torsional stresses on the conduits 10. It should be noted that during wrapping of successive layers of conduits, that the successive layers are preferably contra-helically wound about the central core.

The foregoing disclosure and description of the invention are illustrative and explanatory thereof, and various changes in the size, shape and materials as well as in the details of the illustrated construction may be made without departing from the spirit and scope of the invention.

I claim:

1. A method for forming a non-tensioned multi-conduit line from a plurality of conduits and a central core as the plurality of conduits and the central core are pulled longitudinally along the lengths thereof from fixed payout reels, comprising the steps of:
   positioning a plurality of conduits longitudinally parallel to and surrounding the central core with the conduits disposed in a cylindrical relationship about the central core;
   longitudinally moving the central core without rotation and simultaneously longitudinally moving the plurality of conduits with the central core;
   oscillating the plurality of conduits about the central core while moving the conduits longitudinally with the central core, said oscillating of the conduits including alternately rotating the conduits in one rotational direction about the central core an amount greater than 360°, then reversing the direction of said rotating of the conduits in an amount greater than 360°;
   frictionally engaging the central core with the conduits prior to said reversing and disengaging said frictionally engaging of the central core with the conduits after said reversing during said oscillating of the conduits about the central core;
   repeating said oscillating in succession about the central core as the central core and conduits are moved longitudinally to lay the conduits in contact with the central core in alternating non-twisted helical lays of substantially 360° in each rotational direction; and,
   securing the plurality of conduits in a non-twisted, contacting condition about the central core.

2. The method of claim 1, wherein said securing includes the step of:
   closing the plurality of conduits from an expanded position about the central core into engagement with the central core in a closing block to form a bundle.

3. The method of claim 2, wherein said securing includes the step of:
   taping the conduits together about the central core to form a bundle after said closing to secure the bundle together.

4. The method of claim 3, wherein said securing further includes the step of:
   forming a cover about the bundle after said taping for protecting the bundle from adverse environmental conditions.

5. The method of claim 1, further including the step of:
   directing the conduits and the central core from a plurality of respective fixed payout reels through a fixed guide prior to said positioning.

6. The method of claim 5, further including the step of:
   guiding the conduits and the central core to and through a rotating head assembly prior to said securing and after said positioning such that the conduits and the central core extend between the fixed guide and a rotating head assembly with the conduits disposed substantially equidistant about the central core along the length thereof.

7. The method of claim 6, wherein:
   said oscillating is accomplished by rotational movement of the rotating head assembly; and,
   twisting of the conduits occurs between the fixed guide and the rotating head assembly prior to said securing of the conduits in a non-twisted condition with the central core.

8. The method of claim 7, wherein:
   said frictionally engaging of the conduits about the central core results in primarily localized torsional stresses between the payout reels and substantially the midpoint of the distance between the rotating head assembly and the fixed guide.

9. The method of claim 1, further including the step of:
   wrapping successive layers of conduits contrahelically about the central core.

10. The method of claim 9, further including:
    locating the successive layers of conduits such that the neutral points formed at the point of rotational directional change of the conduits on the central core are displaced from one another.

11. The method of claim 5, further including the step of:
    twisting the conduits between said directing and said positioning.

12. The method of claim 5, further including the step of:
    twisting the conduits prior to said positioning.

* * * * *